(12) United States Patent
Gaskell et al.

(10) Patent No.: US 11,727,062 B1
(45) Date of Patent: Aug. 15, 2023

(54) SYSTEMS AND METHODS FOR GENERATING VECTOR SPACE EMBEDDINGS FROM A MULTI-FORMAT DOCUMENT

(71) Applicant: BlackRock, Inc., New York, NY (US)

(72) Inventors: Paul Vincent Gaskell, Romsey (GB); Thomas Roland Barillot, London (GB)

(73) Assignee: BlackRock, Inc., New York, NY (US)

( * ) Notice: Subject to any disclaimer, the term of this patent is extended or adjusted under 35 U.S.C. 154(b) by 0 days.

(21) Appl. No.: 17/349,444

(22) Filed: Jun. 16, 2021

(51) Int. Cl.
| | |
|---|---|
| G06N 3/00 | (2023.01) |
| G06F 16/901 | (2019.01) |
| G06F 40/103 | (2020.01) |
| G06F 40/131 | (2020.01) |
| G06F 40/30 | (2020.01) |
| G06F 40/279 | (2020.01) |
| G06V 30/414 | (2022.01) |
| G06V 30/416 | (2022.01) |

(52) U.S. Cl.
CPC ........ *G06F 16/9024* (2019.01); *G06F 40/103* (2020.01); *G06F 40/131* (2020.01); *G06F 40/279* (2020.01); *G06F 40/30* (2020.01); *G06N 3/00* (2013.01); *G06V 30/414* (2022.01); *G06V 30/416* (2022.01)

(58) Field of Classification Search
CPC .. G06F 16/9024; G06F 40/103; G06F 40/131; G06F 40/279; G06F 40/30; G06F 40/10; G06F 40/20; G06F 40/40; G06N 3/00
See application file for complete search history.

(56) References Cited

U.S. PATENT DOCUMENTS

| | | | |
|---|---|---|---|
| 5,841,900 A | 11/1998 | Rahgozar et al. | |
| 2004/0093328 A1* | 5/2004 | Damle | G06F 16/345 |
| 2007/0074102 A1* | 3/2007 | Kraft | G06F 16/951 |
| | | | 715/206 |

(Continued)

FOREIGN PATENT DOCUMENTS

CN 110929647 A 3/2020

OTHER PUBLICATIONS

"Graph neural networks: A review of methods and applications" by Zhou et al, retrieved from https://www.sciencedirect.com/science/article/pii/S2666651021000012 and available online Apr. 8, 2021 (Year: 2021).*

(Continued)

*Primary Examiner* — Sanchita Roy
(74) *Attorney, Agent, or Firm* — Haynes Boone LLP

(57) ABSTRACT

Embodiments described herein provide a mechanism that encodes a text document into a geometric graph, where the nodes of the graph represent bits of text from the document and the edges of the graph represent relationships among the bits of text as laid out on a page of the document. Each node of the graph is encoded into a vector representation that contains information of the node and the local sub-graph (including the node and all edges branching out from the node). In this way, the vector representations of the document contain information of the inner-relationship between words, sentences and paragraphs of the document, instead of just mapping the text in the document as a string of input tokens to a vector representation.

18 Claims, 10 Drawing Sheets

(56) References Cited

U.S. PATENT DOCUMENTS

| | | | | |
|---|---|---|---|---|
| 2012/0079372 | A1* | 3/2012 | Kandekar | G06F 3/0482 715/256 |
| 2014/0195897 | A1* | 7/2014 | Balinsky | G06F 16/345 715/254 |
| 2016/0329044 | A1* | 11/2016 | Cao | G06N 5/022 |
| 2021/0209472 | A1* | 7/2021 | Chen | G06F 9/542 |

OTHER PUBLICATIONS

Rastogi et al., "Information Extraction from Document Images via FCA based Template Detection and Knowledge Graph Rule Induction," CVPR, 2020, 9 pages.

Lee et al., "Learning compact graph representations via an encoder-decoder network," Applied Network Science, 2019, 46 pages.

Coüasnon et al., "Recognition of Tables and Forms," Handbook of Document Image Processing and Recognition, 2014, 32 pages.

Osman et al., "Graph-based Text Representation and Matching: A Review of the State of the Art and Future Challenges," 2020, IEEE Access, pp. 1-1, 10.1109/ACCESS.2020.2993191.

Hamilton et al., "Representation Learning on Graphs: Methods and Applications," IEEE, 2018, 24 pages.

* cited by examiner

SYSTEMS AND METHODS FOR GENERATING VECTOR SPACE EMBEDDINGS FROM A MULTI-FORMAT DOCUMENT

TECHNICAL FIELD

The embodiments relate generally to machine learning systems and natural language processing (NLP), and more specifically to systems and methods for generating vector space embeddings from a multi-format document.

BACKGROUND

Natural language processing (NLP) systems perform a number of tasks relating to text inputs in natural languages such as question and answering, text classification, automatic summarization, discourse analysis, machine translation, and/or the like. Existing NLP systems often employ a machine learning model, known as a "language model," which maps text in a document to numerical vectors where the geometry of the vectors encodes some of the semantics of the text. Such language models, however, are only effective when the text can be input to the model in a sequence. When the document contains structures such as tables, titles, lists, and/or other structures where the semantics of the text are largely a function of the spatial layout of the page, it remains challenging to convert textual content in the structures into sequential input for the language model. Thus, for documents that contain a large amount of pre-defined structures such as a financial document with data tables, it remains difficult to build a system for extracting data from the data tables.

Therefore, there is a need for an enhanced NLP system to process complex documents with various data structures and formats.

Figure 1:
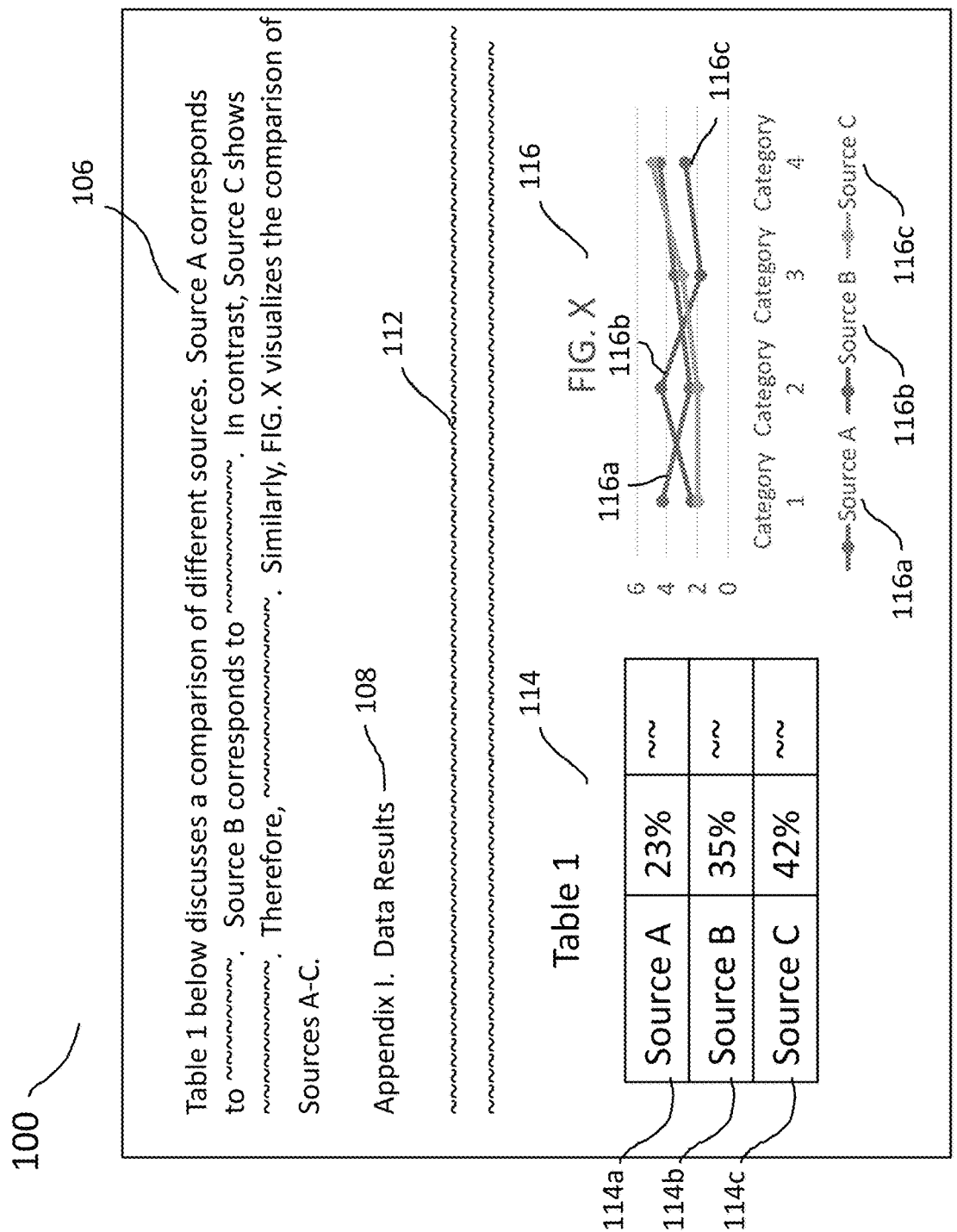
FIG. 1 is a simplified diagram illustrating an example page of a document having multiple structural objects of different formats, according to one embodiment described herein.

In the figures, elements having the same designations have the same or similar functions.

DETAILED DESCRIPTION

In view of the need for a NLP system to process complex documents with various data structures and formats, embodiments described herein provide a NLP system that generates vectors from documents where the geometry of the vectors represents the joint distribution over textual and spatial semantics of the document. Specifically, the NLP system maps an input document to a data structure that reflects the spatial and textual semantics of the document using a graph that encodes the content of the document. The geometric graph includes a plurality of nodes representing bits of text and the edges connecting the nodes represent spatial relationships of bits of the text as the text is spatially laid out on the page. The NLP system then generates numeric vectors from the graph where the geometry of the vectors encodes the textual and spatial semantics of the document. Specifically, the NLP system maps a subgraph surrounding each node of the graph to a vector that contains information about both the node and the local sub-graph around the node.

For example, for an input document that has at least one paragraph of textual description and a structural object such as a data table, the NLP system identifies the textual content of an entire page, and jointly encodes text spans from the one paragraph and the data table. Each text span may include a word, a phrase compirisng a number of words, a string of words, and/or the like. When the description in the paragraph references a cell in the data table, the relationship between the description and the cell in the data table is thus encoded into a representation reflecting the similarity between the vectors representing the paragraph and the cell in the data table in vector space. In this way, both spatial information and semantic relationship between text spans throughout the page of the document can be encoded, instead of encoding the text document as a sequential input of text spans.

In one embodiment, the NLP system generates a document graph for each page of the document, or a few consecutive pages of the document. In this way, the spatial information of the content of the text is captured by the graph.

As used herein, the term "document" may include any format of a document, such as a spreadsheet, a PDF document, a Word document, and/or other types of documents having an editable or non-editable format.

As used herein, the term "text span" may include a word, a phrase compirisng a number of words, a string of words, and/or the like. The length of the text span may be pre-defined, or may be dynamically determined and updated during the encoding process.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

FIG. 1 is a simplified diagram 100 illustrating an example page of a document having multiple structural objects of different formats, according to one embodiment described herein. Diagram 100 shows an example page of a document that includes a paragraph of textual description 106 in the main body of the document, a title of a section "Appendix I." 108, a textual description 112 in the Appendix section 108, a data table 114 comprising various cells 114*a-c*, a data plot chart 116 including various data legends 116*a-c* in the data plot, and/or the like.

Traditionally, text spans in the document, such as words, phrases, and/or the like, may be input to and encoded by an NLP encoder in the form of a sequence of tokens. For example, the sentence "Table 1 below discusses a comparison of different sources" from paragraph 106 may be input to the NLP encoder sequentially and encoded into a vector representation reflecting the sematic information of the words in this sentence. The sequential encoding, however, may lose spatial information of the document as a whole, as the text of the document is laid out spatially as shown in diagram 100. For example, the sentence "Table 1 below discusses a comparison of different sources" in fact references "Table 1" 114, a structural object that appears later in the document. Specifically, description in paragraph 106 further describes cells such as "Source A" 114*a*, "Source B" 114*b*, "Source C" 114*c* in "Table 1" 114.

Thus, instead of treating the text spans in the document as a sequential input of text spans, the NLP system described herein identifies text spans from the entire page (or several consecutive pages) of the document as shown in diagram 100 and encodes all text spans by a graph structure. For example, when a document contains a paragraph describing a data table, and a data table placed underneath the paragraph, the relationship between texts in the paragraph and values in the cells of the data table can be captured by the geometric graph. The resulting vector representation would contain far more information than existing NLP encoders, such as BERT, which receives and encodes an input document as a sequential input of tokens.

For example, text spans such as "Table 1", "Source A," "Source B," "Source C" shown in paragraph 106 may be treated as nodes in the document graph. These nodes are connected to other nodes representing cell "Source A" 114*a*, cell "Source B" 114*b*, and cell "Source C" 114*c* in "Table 1" 114. The edges connecting these nodes representing the correlation between the references in paragraph 106 and the actual cells 114*a-c* in "Table 1" 114.

For another example, the node representing "Table 1" 114 can be connected to the node representing "FIG. X" 116. Specifically, nodes representing cell "Source A" 114*a*, cell "Source B" 114*b*, and cell "Source C" 114*c* in "Table 1" 114 are each connected to nodes representing the legends "Source A" 116*a*, "Source B" 116*b* and "Source C" 116*c* in "FIG. X" 116. The edges connecting these nodes represent the correlation between the cell values in "Table 1" and data plots in "Fig. X". In this way, when the entire page of the document such as shown in diagram 100 is input to the NLP encoder, the spatial relationship between text spans throughout the page is explored. Specifically, in a traditional NLP encoding method, when a document such as shown by diagram 100 is input to the encoder as a sequence of tokens, spatial relationship between two text spans that are far apart in the document, e.g., "Table 1" in paragraph 106 and "table 1" 114 as the title of the table, may be neglected, losing important logical information of the document. Here, for each text span, e.g., "Table 1," its spatial relationship with the rest of the text spans within the document (or a page of the document), including other places in the document where "Table 1" is mentioned, is represented by the generated graph.

The generated graph may then be encoded into vector representations, whose vector embedding for each node reflects a combination of the spatial and sematic relationship between text spans throughout the document.

Figure 2:
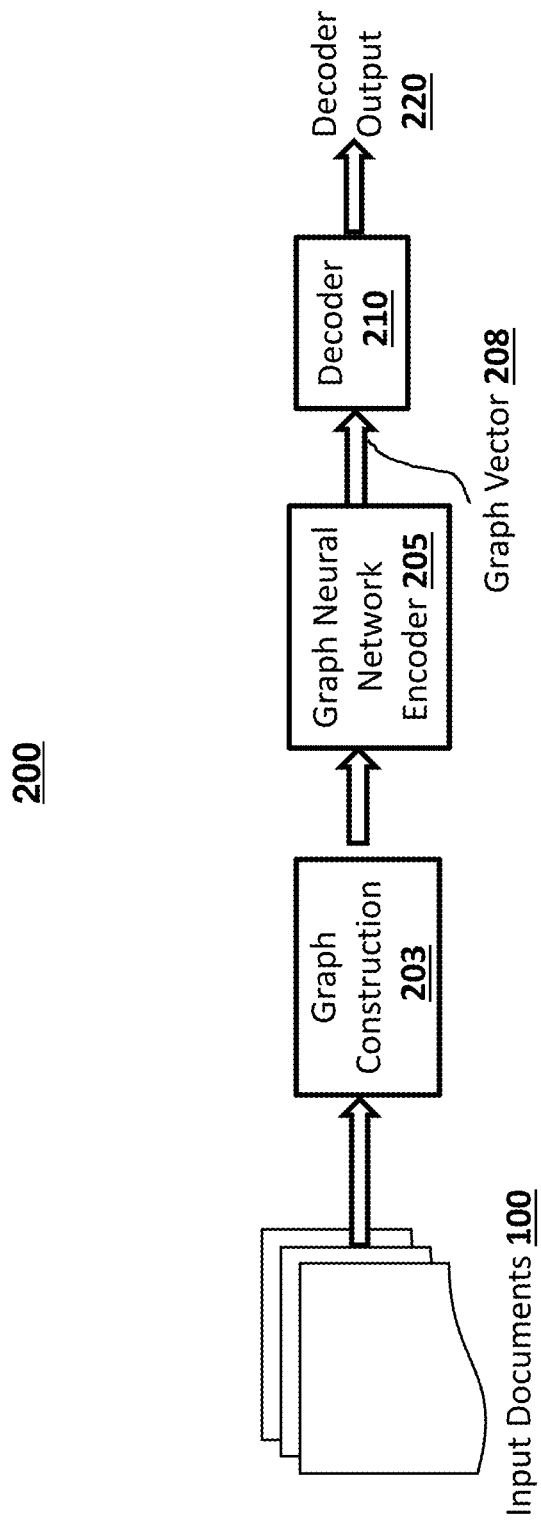
FIG. 2 is a simplified structural diagram illustrating an example structure of the NLP system for processing documents having complex formats as that shown in FIG. 1, according to one embodiment described herein.

FIG. 2 is a simplified structural diagram 200 illustrating an example structure of the NLP system for processing documents having complex formats as that shown in FIG. 1, according to one embodiment described herein. Diagram 200 shows an input document (similar to diagram 100 shown in FIG. 1) is input to a graph construction module 203, connected to a graphic neural network (GNN) encoder 205, and a decoder 210 to generate a decoder output 220.

Specifically, in one embodiment, the graph construction module 203 may identify a plurality of text spans from the document to form a plurality of nodes of a graph, e.g., either from each page of the document, or the entire document. The text span may be at the word level or at the phrase level. For example, the graph construction module 203 may start by estimating an amount of whitespace separation that would indicate a new piece of text (span) and then score each estimate based on a function that calculates how many spans are vertically aligned on the page as a percentage of total spans. Each text span may be added as an individual node to the graph.

Once this graph is created, the GNN encoder 205 encodes the created graph by learning representations of subgraphs around each node in the graph. For example, the GNN encoder 205 may traverse the local graph from each node in the graph and collect the subgraph in a certain order. The collected subgraphs from the respective node are then mapped to a single vector by the GNN encoder 205. For example, the GNN encoder 205 may use the graph neural network to generate a single vector for the respective node as a grand average over all the nodes in the subgraph.

The graph vector 208, which may include a set of subgraph vectors generated for all nodes in the document graph, may then be passed to decoder 210 to perform a NLP task. The geometry of the graph vectors 208 may be relied upon to solve tasks like data point extraction. For example, a user label may be assigned to a single node in document A and then the user label may be used as an example to find the most similar nodes from subsequent documents.

Figure 3:
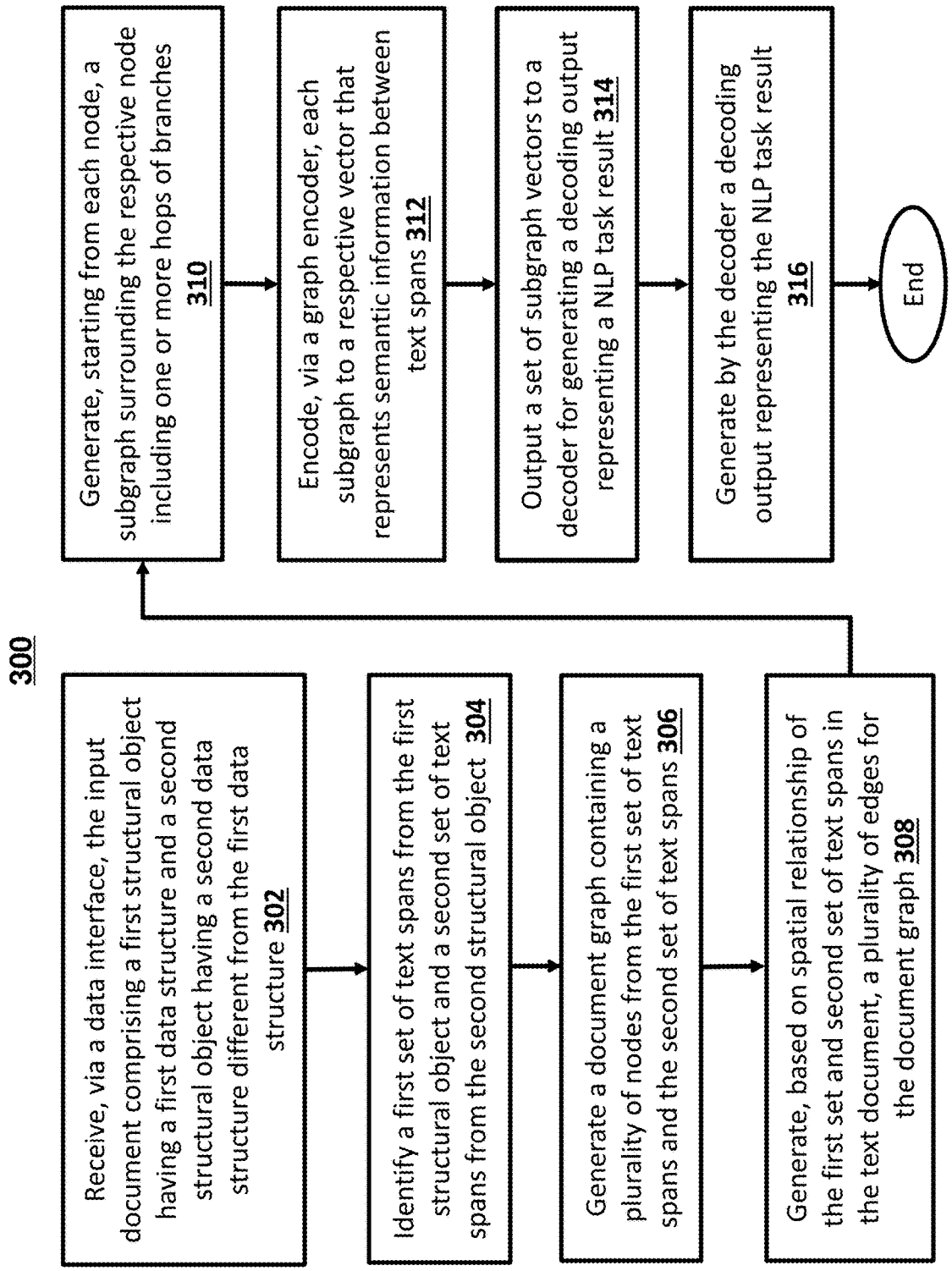
FIG. 3 is a simplified logic flow diagram illustrating a process of spatially encoding a natural language document for performing one or more NLP downstream tasks, according to one embodiment described herein.

FIG. 3 is a simplified logic flow diagram illustrating a process 300 of spatially encoding a natural language document for performing one or more NLP downstream tasks, according to one embodiment described herein. One or more of the processes or steps 302-316 of method 300 may be implemented, at least in part, in the form of executable code stored on non-transitory, tangible, machine-readable media that when run by one or more processors may cause the one or more processors to perform one or more of the processes 302-316.

At step 302, an input document (e.g., as shown at 100 in FIG. 1) comprising a first structural object having a first data structure and a second structural object having a second data structure different from the first data structure may be received, via a data interface. The data interface may be the data interface 715 as further described in relation to FIG. 7.

In one implementation, the document may include any combination of structural objects such as, but not limited to a paragraph of textual description (e.g., see 106 in FIG. 1), an equation, a chemical formula, a data table (e.g., "Table 1" 114 in FIG. 1), a group of bullet points, a list, a data chart, a figure (e.g., "FIG. 1" in FIG. 1) having one or more text spans with a caption, and a subtitle (e.g., 108 in FIG. 1).

At step 304, a first set of text spans from the first structural object and a second set of text spans are identified from the second structural object. Specifically, the first set or the second set of text spans are identified at a word level or a phrase level.

Figure 4:
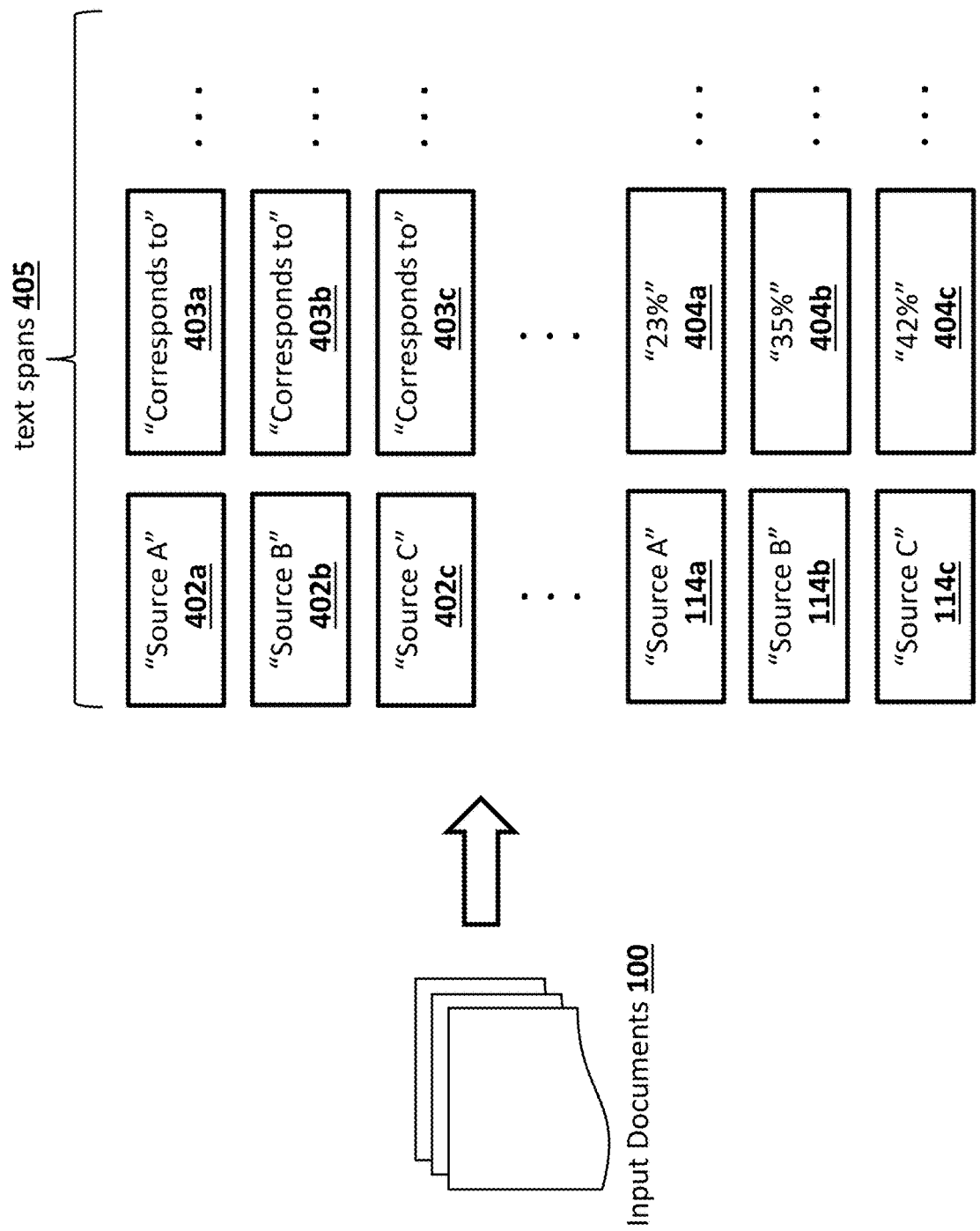
FIG. 4 is a simplified diagram illustrating an example of spatially encoding an input document, according to one embodiment described herein.

For example, FIG. 4 is a simplified diagram illustrating an example of spatially encoding an input document, according to one embodiment described herein. As shown in FIG. 4, text spans 405 such as "Source A" 402a, "Source B" 402b, "Source C" 402c and a plurality of "Corresponds to" 403a-c may be identified from paragraph 106 of the input document 100. Similarly, text spans "Source A" 114a, "23%" 404a, "Source B" 114b, "35%" 404b, "Source C" 114c, "42%" 404c, and/or the like may be identified from cells of "Table 1" 114 of the input document 100.

Referring back to FIG. 3, at step 306, a document graph may be generated containing a plurality of nodes from the first set of text spans and the second set of text spans. Each node represents a text span from the first set of text spans or the second set of text spans.

At step 308, a plurality of edges for the document graph are generated based on spatial information between text spans in the text document. Each edge connecting two nodes in the document graph represents a spatial connection between two corresponding text spans of the text document that correspond to the two nodes.

Figure 5A:
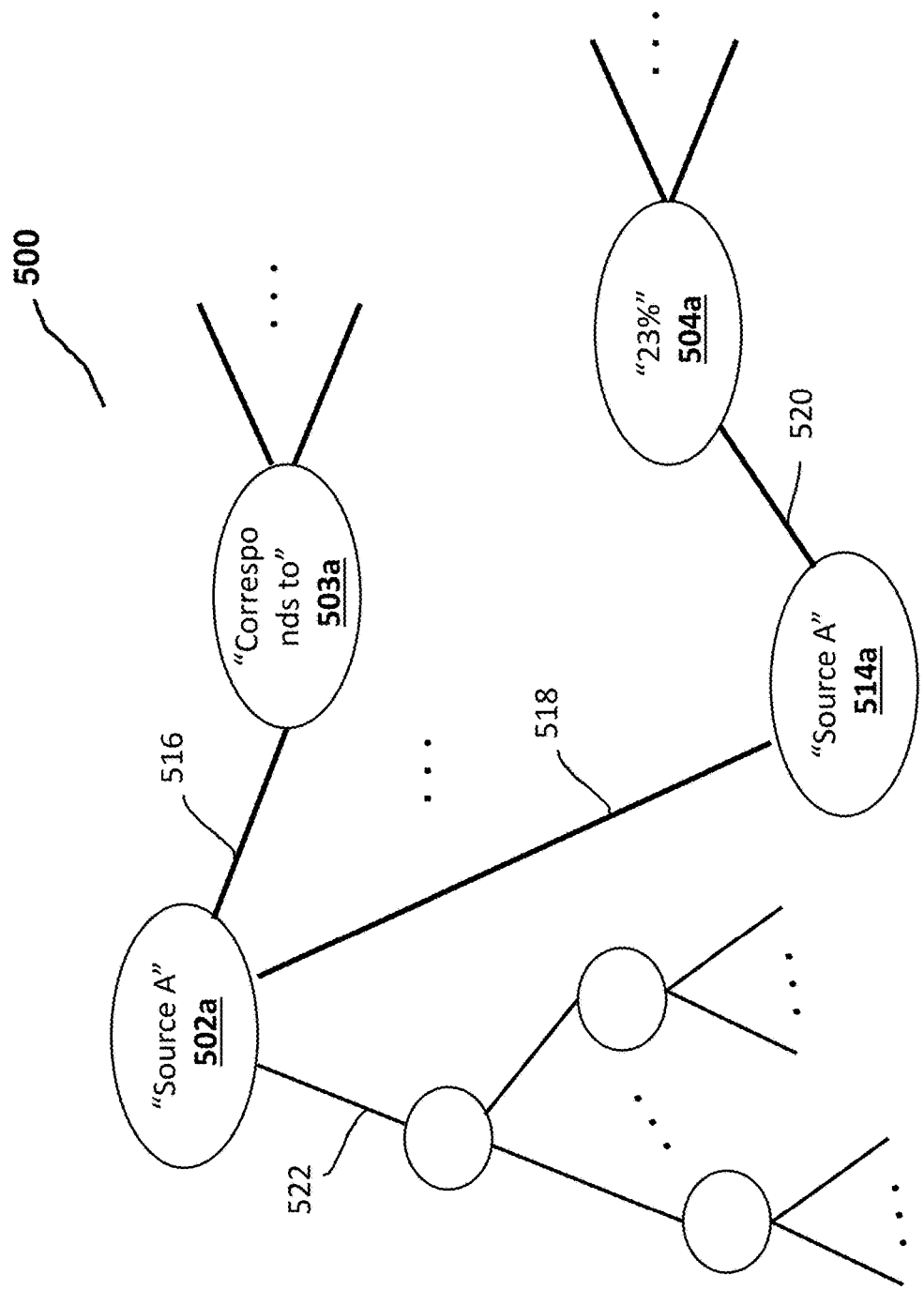
FIGS. 5A-5B are simplified diagrams illustrating a document graph representing spatial and semantic relationships between text spans in the input document, according to one embodiment described herein.

For example, FIG. 5A is a simplified diagram illustrating a document graph 500 representing spatial relationships between text spans in the input document, according to one embodiment described herein. As shown in FIG. 5A, nodes 502a, 503a, 504a, 514a, and/or the like each represent a text span "Source A," "Corresponds to," "23%," "Source A," and/or the like as identified from text spans 405 in FIG. 4. Edges 516, 518, 520 and 522 are generated to connect respective nodes, representing the spatial relationship between the respective text span. For example, edge 518 connects node "Source A" 502a representing the text "Source A" in paragraph 106 and node 514a representing the cell "Source A" in "Table 1" 114 because a spatial relationship exists between the two text spans as "Source A" in paragraph 106 references the cell "Source A" in "Table 1" 114. For another example, edge 520 connects node 514a with node 504a because a spatial relationship exists between node 514a that represents the cell name "Source A" and node 504a that represents the corresponding value "23%" to "Source A" in Table 1. For another example, edge 516 connects node "Source A" 502a representing the text "Source A" in paragraph 106 and node 503a representing the text "Corresponds to" in paragraph 106 because a spatial relationship exists between the two text "Source A" and "Corresponds to" as they appear in adjacent positions in the same sentence and serve as the subject and the verb of a sentence, respectively. This graph may encode a simplified geometry reflecting spatial relationships among the text spans in the page, which may then be used to generate the vectors.

Referring back to FIG. 3, at step 310, a subgraph centered at least one node and all edges branching out from the at least one node is generated. In one implementation, a subgraph comprises the at least one node and a set of nodes that the at least one node is connected to by the all edges branching out from the at least one node. In one implementation, the subgraph includes one or more hops of branches from the centered node.

Figure 5B:
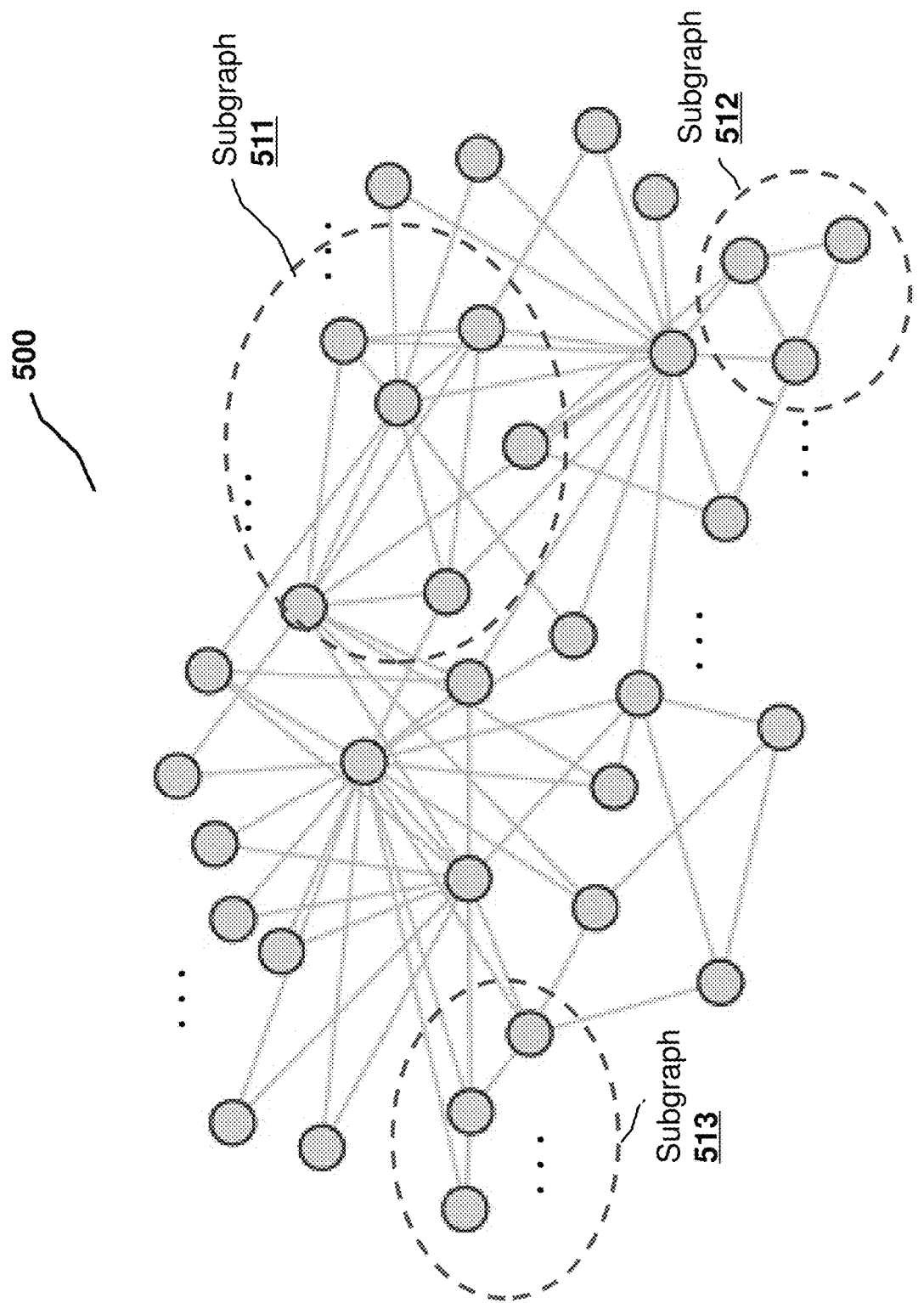

For example, FIG. 5B is a simplified diagram illustrating the document graph 500 as having a number of subgraphs, according to one embodiment described herein. As shown in FIG. 5B, document graph 500 that has been constructed in FIG. 5A may include subgraphs 511, 512 and 513. Each subgraph may center at a respective node and may include branches stemming from the respective node and the connected nodes. In some implementations, a subgraph may include one or more hops of braches from the centered node.

In one embodiment, the subgraph vector is generated by traversing each node in the subgraph according to a pre-defined order, and encoding, by a GNN (e.g., GNN encoder 205 in FIG. 2), text spans obtained from the traversal of nodes in the pre-defined order to the subgraph vector. For example, the subgraph vector may be encoded by taking a weighted average over all nodes in the subgraph with the weights calculated by some neural network attention mechanism.

Figure 6A:
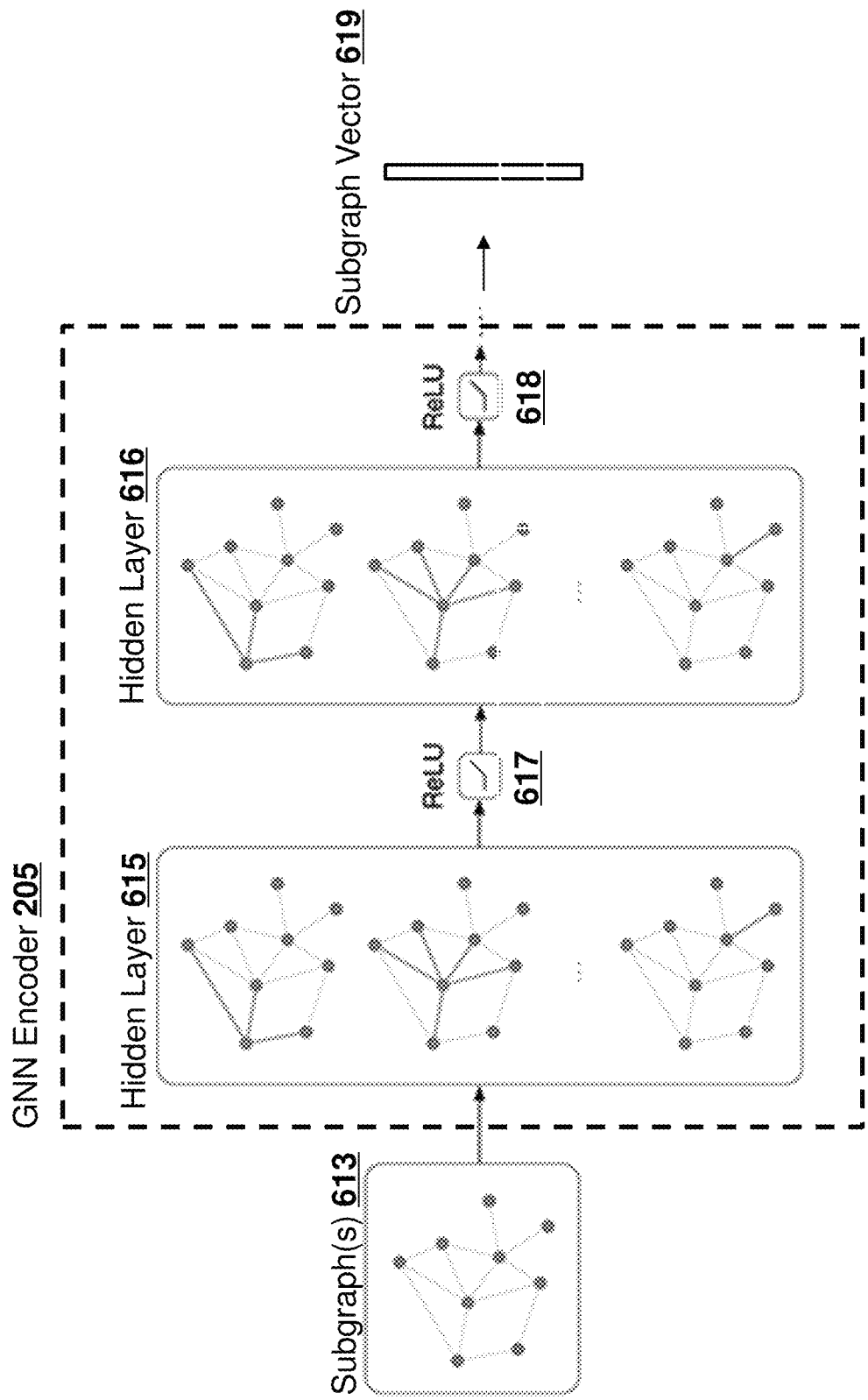
FIGS. 6A-6C are simplified diagrams illustrating transforming the document graph to an encoded vector representing the input document, according to one embodiment described herein.

For example, FIG. 6A is a simplified diagram illustrating encoding a subgraph to a subgraph vector via a GNN encoder, according to one embodiment described herein. As shown in FIG. 6A, a subgraph 613 (e.g., any of subgraphs 511, 512, 513 and/or the like of the graph 500 in FIG. 5B) may be input to a GNN encoder 205. The GNN encoder 205 may include a plurality of hidden layers 615, 616, and/or the like, connected by a ReLU operation 617, 618. In another implementation, for each hidden layer 615, an attention layer (not shown in FIG. 6A) may be (optionally) added to compute a weighted average of the inputs. The GNN encoder 205 may encode the subgraph input 613 into a subgraph vector 619.

Figure 6B:
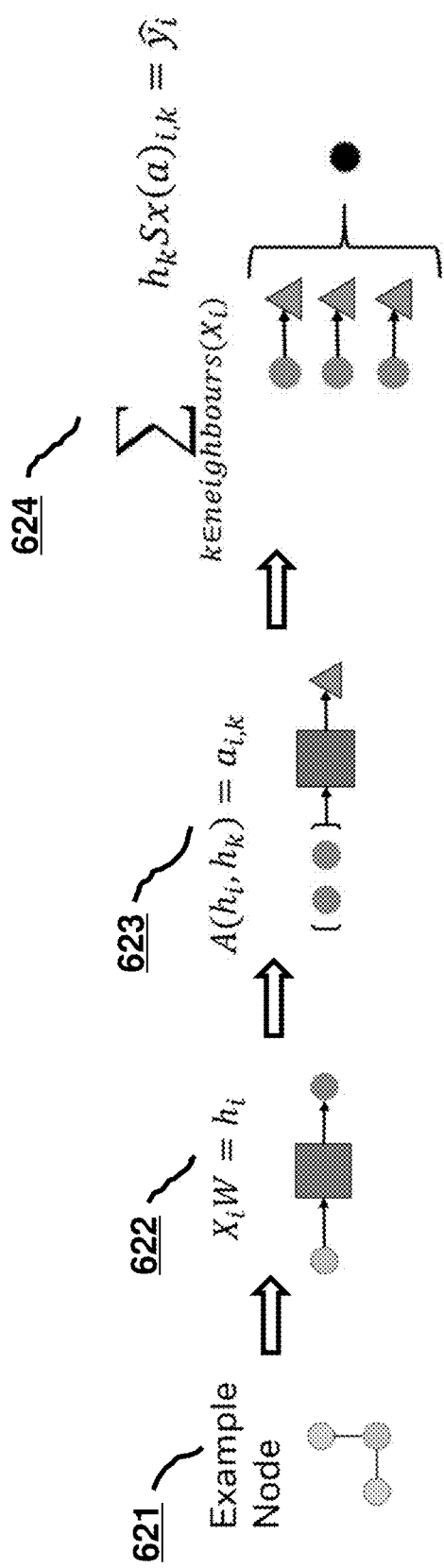

For another example, FIG. 6B is a simplified diagram illustrating a process of encoding a subgraph to a subgraph vector by the GNN encoder 205, according to one embodiment described herein. As shown in FIG. 6B, a subgraph 621 centered around an example node may be input to the GNN encoder 205. At stage 622, the node $X_i$ may be mapped through a linear projection layer to obtain a hidden layer state representation:

$$X_iW=h_i,$$

where $X_i$ denotes the ith node (which can be a word2vec vector), W denotes the linear projection, and $h_i$ denotes the corresponding hidden layer state. At stage 623, a Transformer layer A( )may be applied to the generated hidden layer states:

$$A(h_i, h_k)=\alpha_{i,k},$$

where $\alpha_{i,k}$ represents the attention output between two hidden layer states corresponding to two separate nodes $X_i$ and $X_k$. At stage 624, an average of the neighboring nodes of node $X_i$ is computed as the subgraph vector $\hat{y}_i$:

$$\Sigma_{k \in neighbors(X_i)} h_k Sx(\alpha)_{i,k} = \hat{y}_i,$$

where $Sx(\alpha)_{i,k}$ is a softmax function applied to the attention coefficient distribution $\alpha$. For example, the softmax function is applied to determine the attention coefficient depending on the maximum probability in the distribution $\alpha$.

Therefore, in this way, the GNN encoder 205 may be trained with a loss objective of:

$$L = \sum_i |f(X_i) - g(X_i)|$$

where $f(\ )$denotes the neural network (with random removal of input data), and $f(X_i)$ denotes the embedding vector for the i-th node generated by applying the neural network $f$ to the input X; $g(\ )$denotes the neural network with radomised weight parameters; and $|f(X_i)-g(X_i)|$ denotes the Euclidean distance between the vectors.

Figure 6C:
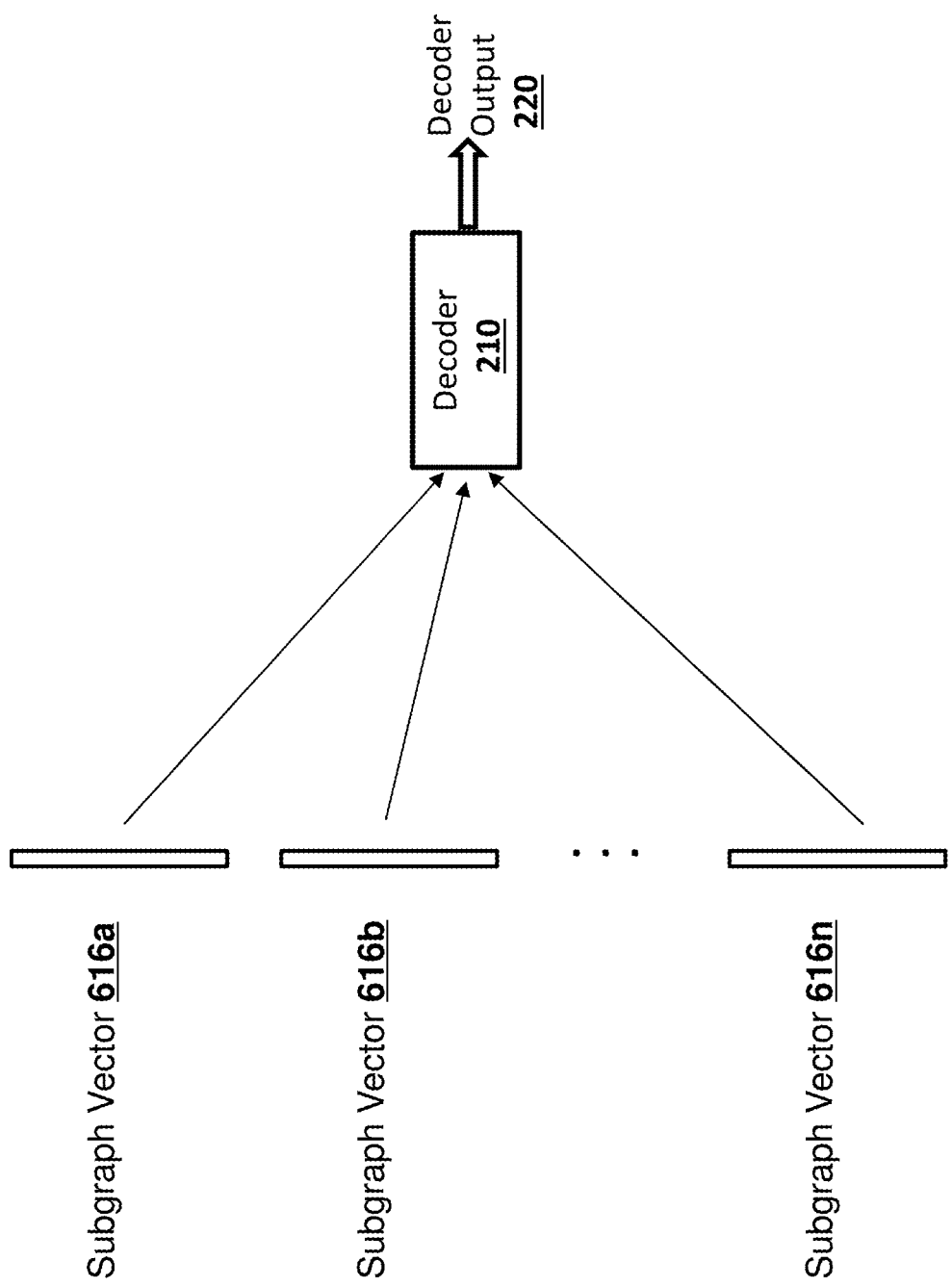

Referring back to FIG. 3, at step 312, a set of subgraph vectors representing a collection of subgraphs in the document graph may be mapped to a corresponding set of subgraph vectors that represent the text document. For example, the set of subgraph vectors may be output to a decoder for performing various tasks. FIG. 6C is a simplified diagram illustrating combining subgraph vectors 616a-n into decoder 210 which in turn generates a decoder output 220, e.g., a text classification, a summarization to the document, a machine translation of the document, and/or the like.

Referring back to FIG. 3, at step 314, the single vector is output to a decoder for generating a decoding output representing a NLP task result. At step 316, the decoder may generate a decoding output representing the NLP task result.

Figure 7:
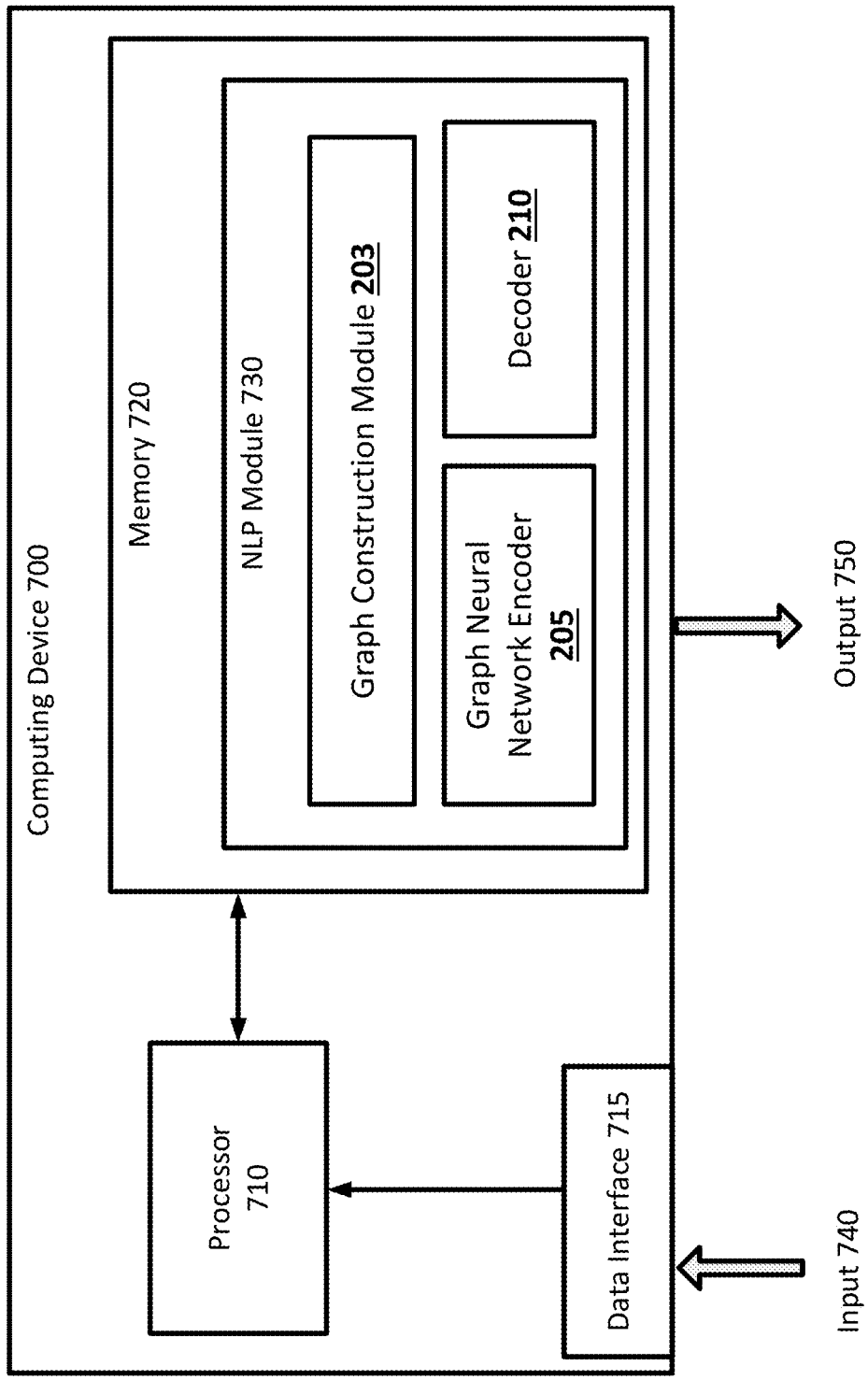
FIG. 7 is a simplified diagram of a computing device that implements an NLP system for the graph-based encoding, according to some embodiments described herein.

FIG. 7 is a simplified diagram of a computing device 700 that implements an NLP system for the graph-based encoding, according to some embodiments described herein.

As shown in FIG. 7, computing device 700 includes a processor 710 coupled to memory 720. Operation of computing device 700 is controlled by processor 710. And although computing device 700 is shown with only one processor 710, it is understood that processor 710 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 700. Computing device 700 may be implemented as a stand-alone subsystem, as a board added to a computing device, and/or as a virtual machine.

Memory 720 may be used to store software executed by computing device 700 and/or one or more data structures used during operation of computing device 700. Memory 720 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 710 and/or memory 720 may be arranged in any suitable physical arrangement. In some embodiments, processor 710 and/or memory 720 may be implemented on a same board, in a same package (e.g., system-in-package), on a same chip (e.g., system-on-chip), and/or the like. In some embodiments, processor 710 and/or memory 720 may include distributed, virtualized, and/or containerized computing resources. Consistent with such embodiments, processor 710 and/or memory 720 may be located in one or more data centers and/or cloud computing facilities.

In some examples, memory 720 may include non-transitory, tangible, machine readable media that includes executable code that when run by one or more processors (e.g., processor 710) may cause the one or more processors to perform the methods described in further detail herein. For example, as shown, memory 720 includes instructions for a NLP module 730 that may be used to implement and/or emulate the systems and models, and/or to implement any of the methods described further herein. In some examples, the NLP module 730, may receive an input 740, e.g., such as an input document having multiple structural objects of different formats, via a data interface 715. The data interface 715 may be any of a user interface that receives a user uploaded document, or a communication interface that may receive or retrieve a previously stored training document from the database. The NLP module 730 may generate an output 750, e.g., a downstream task output such as the classification, summarization, machine translation, and/or the like of the input 740.

In some embodiments, the NLP module 730 may further includes the graph construction module 203, GNN encoder 205, and decoder 210. The graph construction module 203, GNN encoder 205, and decoder 210 may exploit the spatial and semantic relationship between text spans in the input 740, as described in relation to FIGS. 1-6C.

In some examples, the NLP module 730 and the sub-modules 203, 205 and 210 may be implemented using hardware, software, and/or a combination of hardware and software.

Some examples of computing devices, such as computing device 700 may include non-transitory, tangible, machine readable media that include executable code that when run by one or more processors (e.g., processor 710) may cause the one or more processors to perform the processes of method 300 in FIG. 3. Some common forms of machine readable media that may include the processes of method 300 in FIG. 3 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of spatially encoding a natural language document for performing one or more natural language processing (NLP) downstream tasks, the method comprising:
    receiving, via a data interface, an input document comprising a first structural object having a first data structure and a second structural object having a second data structure different from the first data structure;
    identifying a first set of text spans from the first structural object and a second set of text spans from the second structural object;
    generating a document graph containing a plurality of nodes from the first set of text spans and the second set of text spans, wherein each node represents a text span from the first set of text spans or the second set of text spans;
    generating, based on spatial information of the text document, a plurality of edges for the document graph, wherein each edge connecting two nodes in the document graph represents a spatial relationship in a context of the text document between two text spans that correspond to the two nodes;
    generating, starting from each respective node in the document graph, a respective subgraph containing the respective node and all edges branching out from the respective node;
    encoding, by a graph neural network, each respective subgraph corresponding to each node in the document graph, into a respective subgraph vector that represents semantic information about the respective subgraph by:
        mapping, via linear projection, a center node of the respective subgraph to a respective hidden layer state representation,
        generating a respective attention output between the respective hidden layer state representation corresponding to the respective subgraph and another hidden layer state representation mapped from another subgraph corresponding to another node in the document graph,
        generating a set of hidden layer state representations and a set of attention outputs corresponding to neighboring nodes of the center node, and
        computing the respective subgraph vector by taking a weighted average of the set of attention outputs weighted by the set of hidden layer state representations; and
    generating, by a decoder, a decoding output representing a NLP task result based on subgraph vectors corresponding to all nodes in the document graph.

2. The method of claim 1, wherein the first set of text spans are identified at a word level or a phrase level from the first structural object.

3. The method of claim 1, further comprising:
    iterating the plurality of nodes in the document graph; and
    generating, based on the iterating, the set of subgraph vectors.

4. The method of claim 1, wherein the plurality of edges contains at least one edge that connects a first node representing a first text span from the first set of text spans and a second text span from the second set of text spans, and
    wherein the at least one edge is determined based on a spatial relationship between the first text span and the second text span.

5. The method of claim 1, wherein the respective subgraph comprises the respective node and a set of nodes that the respective node is connected to by the all edges branching out from the respective node.

6. The method of claim 1, wherein the respective subgraph comprises more than one hop of branches from the respective node.

7. The method of claim 1, wherein the respective subgraph vector is generated by:
    traversing each node in the respective subgraph according to a pre-defined order; and
    encoding, by the graph neural network, text spans obtained from the traversal of nodes in the pre-defined order to the respective subgraph vector.

8. The method of claim 1, wherein the first structural object or the second structural object includes any combination of:
    a paragraph of textual description;
    an equation;
    a chemical formula;
    a table;
    a group of bullet points;
    a list;
    a data chart;
    a figure having one or more text spans; and
    a subtitle.

9. A system for spatially encoding a natural language document for performing one or more natural language processing (NLP) downstream tasks, the system comprising:
    a hardware network interface that receives an input document comprising a first structural object having a first data structure and a second structural object having a second data structure different from the first data structure;
    a memory that stores a plurality of processor-executable instructions; and
    a processor that reads and executes the plurality of processor-executable instructions to:
    identify a first set of text spans from the first structural object and a second set of text spans from the second structural object;
    generate a document graph containing a plurality of node from the first set of text spans and the second set of text spans, wherein each node represents a text span from the first set of text spans or the second set of text spans;
    generate, based on spatial information of the text document, a plurality of edges for the document graph, wherein each edge connecting two nodes in the document graph represents a spatial relationship in a context of the text document between two text spans that correspond to the two nodes;
    generate, starting from each respective node in the document graph, a respective subgraph containing the respective node and all edges branching out from the respective one node;
    encode, by a graph neural network, each respective subgraph corresponding to each node in the document graph, into a respective subgraph vector that represents semantic information between text spans by:
        mapping, via linear projection, a center node of the respective subgraph to a respective hidden layer state representation,
        generating a respective attention output between the respective hidden layer state representation corresponding to the respective subgraph and another hidden layer state representation mapped from another subgraph corresponding to another node in the document graph, generating a set of hidden layer state representations and a set of attention outputs corresponding to neighboring nodes of the center node, and computing the respective subgraph vector by taking a weighted average of the set of attention outputs weighted by the set of hidden layer state representations; and generate, by a decoder, a decoding output representing a NLP task result based on subgraph vectors corresponding to all nodes in the document graph.

10. The system of claim 9, wherein the first set of text spans are identified at a word level or a phrase level from the first structural object.

11. The system of claim 9, wherein the processor further reads and executes the plurality of processor-executable instructions to:
iterate the plurality of nodes in the document graph; and
generate the set of subgraph vectors based on the iterating.

12. The system of claim 9, wherein the plurality of edges contains at least one edge that connects a first node representing a first text span from the first set of text spans and a second text span from the second set of text spans, and
wherein the at least one edge is determined based on a spatial relationship between the first text span and the second text span.

13. The system of claim 9, wherein the respective subgraph comprises the respective node and a set of nodes that the respective node is connected to by the all edges branching out from the respective node.

14. The system of claim 9, wherein the respective subgraph vector is generated by:
traversing each node in the respective subgraph according to a pre-defined order; and
encoding, by the graph neural network, text spans obtained from the traversal of nodes in the pre-defined order to the respective subgraph vector.

15. The system of claim 9, wherein the first structural object or the second structural object includes any combination of:
a paragraph of textual description;
an equation;
a chemical formula;
a table;
a group of bullet points;
a list;
a data chart;
a figure having one or more text spans; and
a subtitle.

16. A non-transitory processor-readable medium storing a plurality of processor-executable instructions for spatially encoding a natural language document for performing one or more natural language processing (NLP) downstream tasks, the processor-executable instructions being executed by a processor to:
receive, via a data interface, the input document comprising a first structural object having a first data structure and a second structural object having a second data structure different from the first data structure;
identify a first set of text spans from the first structural object and a second set of text spans from the second structural object;
generate a document graph containing a plurality of node from the first set of text spans and the second set of text spans, wherein each node represents a text span from the first set of text spans or the second set of text spans;
generate, based on spatial information of the text document, a plurality of edges for the document graph, wherein each edge connecting two nodes in the document graph represents a spatial relationship in a context of the text document between two text spans that correspond to the two nodes;
generate, starting from each respective node in the document graph, a respective subgraph containing the respective node and all edges branching out from the respective node;
encode, by a graph neural network, each respective subgraph corresponding to each node in the document graph, into a respective subgraph vector that represents semantic information between text spans by:
mapping, via linear projection, a center node of the respective subgraph to a respective hidden layer state representation,
generating a respective attention output between the respective hidden layer state representation corresponding to the respective subgraph and another hidden layer state representation mapped from another subgraph corresponding to another node in the document graph,
generating a set of hidden layer state representations and a set of attention outputs corresponding to neighboring nodes of the center node, and
computing the respective subgraph vector by taking a weighted average of the set of attention outputs weighted by the set of hidden layer state representations; and
generating, by a decoder, a decoding output representing a NLP task result based on subgraph vectors corresponding to all nodes in the document graph.

17. The medium of claim 16, wherein the plurality of edges contains at least one edge that connects a first node representing a first text span from the first set of text spans and a second text span from the second set of text spans, and
wherein the at least one edge is determined based on a logical relationship between the first text span and the second text span.

18. The medium of claim 16, wherein the respective subgraph vector is generated by:
traversing each node in the respective subgraph according to a pre-defined order; and
encoding, by the graph neural network, text spans obtained from the traversal of nodes in the pre-defined order to the respective subgraph vector.

\* \* \* \* \*